(12) United States Patent
Dickinson

(10) Patent No.: US 7,557,936 B2
(45) Date of Patent: Jul. 7, 2009

(54) DIGITIZER ADAPTER

(75) Inventor: Brian R. Dickinson, Grass Lake, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 385 days.

(21) Appl. No.: 11/403,372

(22) Filed: Apr. 12, 2006

(65) Prior Publication Data
US 2007/0242280 A1    Oct. 18, 2007

(51) Int. Cl.
*G01B 11/14* (2006.01)
(52) U.S. Cl. ...................................... 356/620
(58) Field of Classification Search ................ 356/620; 250/559.1, 559.33; 702/150–155; 382/154
See application file for complete search history.

(56) References Cited

U.S. PATENT DOCUMENTS

| | | | |
|---|---|---|---|
| 5,267,143 A * | 11/1993 | Pryor | 700/56 |
| 5,748,505 A | 5/1998 | Greer | |
| 6,128,585 A | 10/2000 | Greer | |
| 6,134,507 A | 10/2000 | Markey, Jr. et al. | |
| 6,166,809 A * | 12/2000 | Pettersen et al. | 356/612 |
| 6,285,959 B1 | 9/2001 | Greer | |
| 6,456,339 B1 * | 9/2002 | Surati et al. | 348/745 |
| 6,460,004 B2 | 10/2002 | Greer et al. | |
| 6,717,683 B1 | 4/2004 | Wakashiro et al. | |
| 6,901,673 B1 * | 6/2005 | Cobb et al. | 33/502 |
| 6,917,720 B1 | 7/2005 | Caesar et al. | |
| 6,990,215 B1 | 1/2006 | Brown et al. | |
| 2004/0150816 A1 | 8/2004 | Wakashiro et al. | |
| 2006/0227210 A1 * | 10/2006 | Raab et al. | 348/139 |
| 2007/0016386 A1 * | 1/2007 | Husted | 702/150 |

OTHER PUBLICATIONS

Geodetic Services Inc., The Basics of Photogrammetry, May 9, 2002, pp. 30-37 in PDF provided, http://web.archive.org/web/20020509235639/http://www.geodetic.com/Whatis.htm.*

* cited by examiner

*Primary Examiner*—Tarifur Chowdhury
*Assistant Examiner*—Michael Lapage
(74) *Attorney, Agent, or Firm*—Gifford, Krass, Sprinkle, Anderson & Citkowski, P.C.

(57) ABSTRACT

A method of scanning an object includes the steps of: providing a digitizer adapter having at least three markers disposed along a target surface thereof, wherein the digitizer adapter includes a spherical member disposed a predetermined distance at its center point to each of the at least three markers; securing the adapter along an outer surface of the object; creating a plurality of digital images of the object; extracting the coordinates of the at least three markers from the image using photogrammetry; calculating the coordinates of the center point of the spherical member based on the coordinates of the at least three markers; generating surface data by scanning the outer surface of the object and the spherical member; calculating the coordinates of the center point of the spherical member based on at least three points from the surface data of the spherical member; and aligning the center point coordinates to facilitate combining the data from the photogrammetric and surface scan processes.

6 Claims, 3 Drawing Sheets

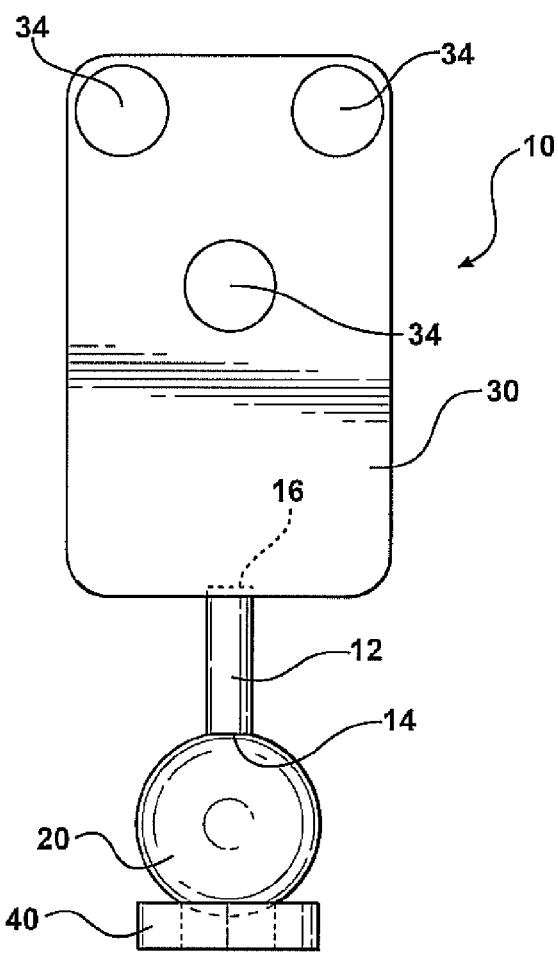
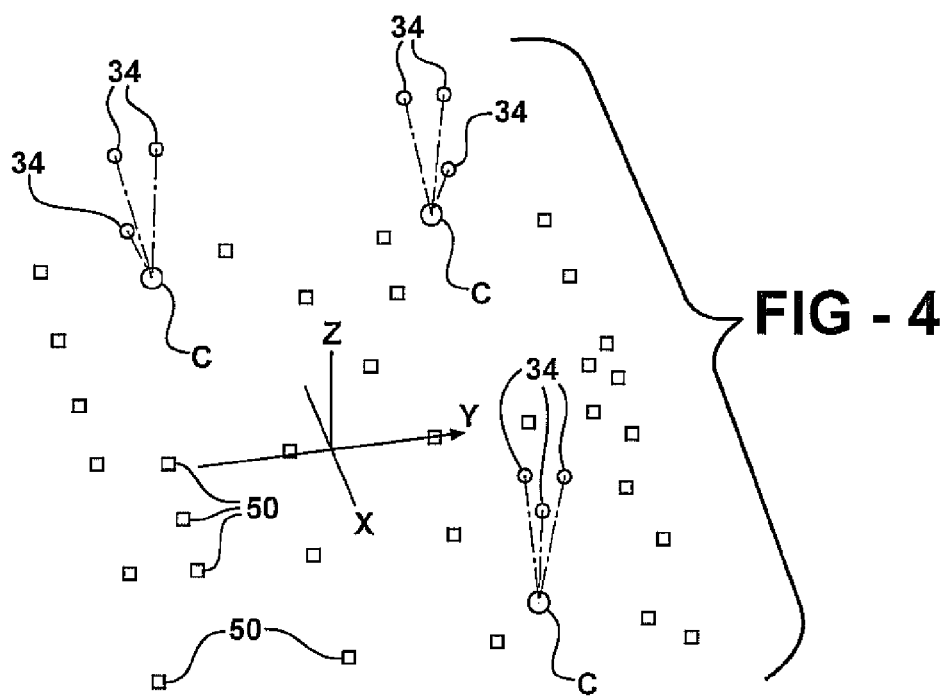

DIGITIZER ADAPTER

FIELD OF THE INVENTION

The invention relates to tools used in the field of object measurement. More particularly, the invention relates to a digitizer adapter that provides an adjustable target mountable to an object to be measured, which facilitates combining surface scan data and photogrammetry data taken of the object.

BACKGROUND OF THE INVENTION

In the field of object measurement, three dimensional (3D) scanners are used to measure and collect point data related to the shape of an object. The collected data or "point cloud" can then be used to reconstruct by extrapolation a 3D model of the object. The 3D model may be used in a wide variety of applications, such as in a manufacturing setting for taking quality control measurements of manufactured parts and comparing the measurements to the theoretical CAD data. There are two general types or classes of 3D scanners: contact and non-contact.

Contact 3D scanners take point measurements of the object through physical touch using a probe end mounted to an articulating arm. A coordinate measuring machine (or CMM) is a common example of a contact 3D scanner. Contact 3D scanners, however, do pose some disadvantages. One disadvantage is that it requires contact with the object being scanned, which presents the potential to modify or damage it. This is significant when scanning pliable, delicate or valuable objects. The other disadvantage of contact scanners is that they are generally slow compared to the other scanning methods. Physically moving the articulating arm that the probe is mounted on can be slow and tedious.

There are generally two types of non-contact scanners: active and passive. Active scanners emit some form of radiation and detect its reflection in order to probe an object. Possible types of radiation used include light, ultrasound or x-ray. Passive scanners, on the other hand, do not emit any kind of radiation themselves. Instead, passive scanners rely on detecting reflected ambient radiation, typically in the visible light portion of the spectrum.

Photogrammetry is an example of a measuring technique utilizing a passive scanner in the form of a digital camera. In photogrammetry, the three-dimensional coordinates of points on the object are determined by measurements made in two or more photographic images taken from different positions. Common points are identified on each image. A line of sight or ray can then be constructed from the camera location to the point on the object. The intersection or triangulation of these rays determines the three-dimensional location of the point. Photogrammetry is particularly useful in extracting data relating to the position of points along the outer surface of the scanned object, but provides very limited information about the outer surface itself.

Laser surface scanning is well known for scanning the outer surface of the object. Laser scanners, or other similar surface scanners, are useful in providing data on the outer surface of the object, but are not well suited for extracting point or edge data from the object.

The shortcomings of these scanning methods can be overcome by combining the data provided by each, thereby gaining the advantages of both technologies. Thus, it remains desirable to provide a tool that facilitates combining the data from photogrammetric and surface scanning techniques and a method for the use of such a tool in the field.

SUMMARY OF THE INVENTION

According to one aspect of the invention, a digitizer adapter assembly includes a stem, a spherical member and a ring. The stem extends between opposite ends along a longitudinal axis. The target is coupled to one end of the stem. The target has at least three markers disposed along a target surface. The spherical member is fixedly secured to the opposite end of the stem relative to the target. The spherical member is made from a ferrous material. The ring is adapted to be fixedly secured to an outer surface of an object to be measured. The ring is magnetically charged to attract the spherical member and maintain the position of the target relative to the object to be measured.

According to another aspect of the invention, a method of scanning an object is provided, which includes the steps of: providing a digitizer adapter having at least three markers disposed along a target surface thereof, wherein the digitizer adapter includes a spherical member disposed a predetermined distance at its center point to each of the at least three markers; securing the adapter along an outer surface of the object; creating a plurality of digital images of the object; extracting the coordinates of the at least three markers from the image using photogrammetry; calculating the coordinates of the center point of the spherical member based on the coordinates of the at least three markers; generating surface data by scanning the outer surface of the object and the spherical member; calculating the coordinates of the center point of the spherical member based on at least three points from the surface data of the spherical member; and aligning the center point coordinates to facilitate combining the data from the photogrammetric and surface scan processes.

BRIEF DESCRIPTION OF THE DRAWINGS

Advantages of the present invention will be readily appreciated as the same becomes better understood by reference to the following detailed description when considered in connection with the accompanying drawing, wherein:

FIG. 2 is a front view of the digitizer adapter assembly;

FIG. 4 is a perspective view of a point cloud generated in the scan illustrated in FIG. 3.

DETAILED DESCRIPTION OF THE INVENTION

Figure 1:
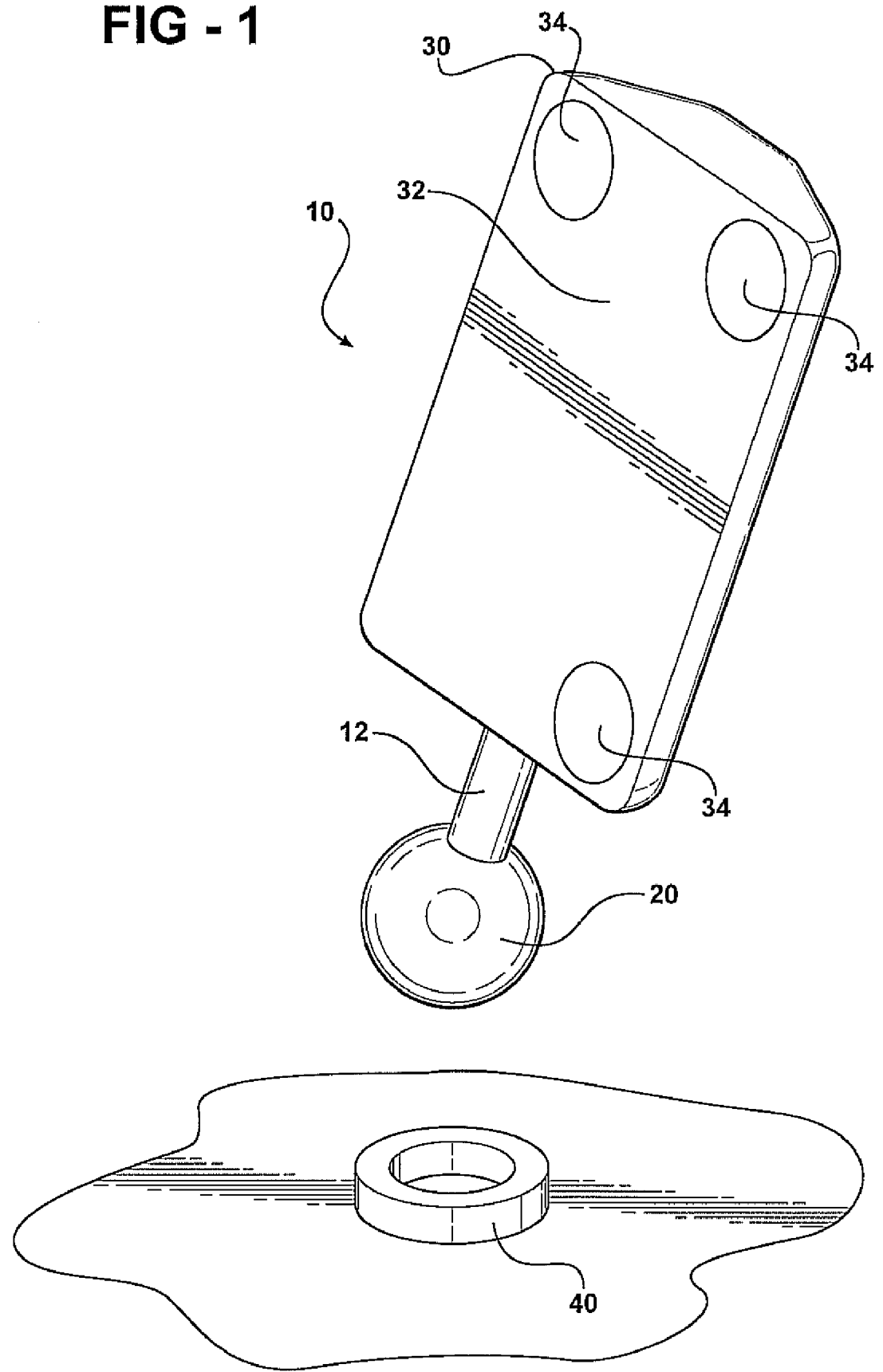
FIG. 1 is a perspective view of a digitizer adapter assembly according to one embodiment of the invention.

Referring to FIGS. 1 and 2, a digitizer adapter assembly according to the invention is generally indicated at 10. The adapter assembly 10 includes a stem 12 extending between opposite ends 14, 16 along a longitudinal axis. A ferrous spherical member 20 is fixedly secured to one end 14 of the stem 12, while a target 30 is disposed at the opposite end 16 of the stem 12. The target 30 is pivotally coupled to the opposite end 16 of the stem 12 for selective rotation about the longitudinal axis of the stem 12.

The target 30 includes a generally rectangular target surface 32. At least three markers or circular dots 34 are disposed along the target surface 32. The target surface 32 and the dots 34 should be colored so as to have high contrast relative to each other. Illustratively, the target surface 32 is black and the dots 34 are white.

A mounting ring 40 is provided for mounting the adapter assembly 10 to an object to be scanned. More specifically, the mounting ring 40 is magnetic for attaching the ring 40 to any ferrous metal surface and for attracting the spherical member 20. The magnetic pull of the ring 40 is strong enough to attract the spherical member 20. Sufficient friction is created between the spherical member 20 and the ring 40 to maintain the position of the target 30, particularly where the target 30 is positioned at an angle relative to vertical. By this arrangement, the target 30 can be positioned so that target surface 32 is always visible to the scanning equipment.

Figure 3:
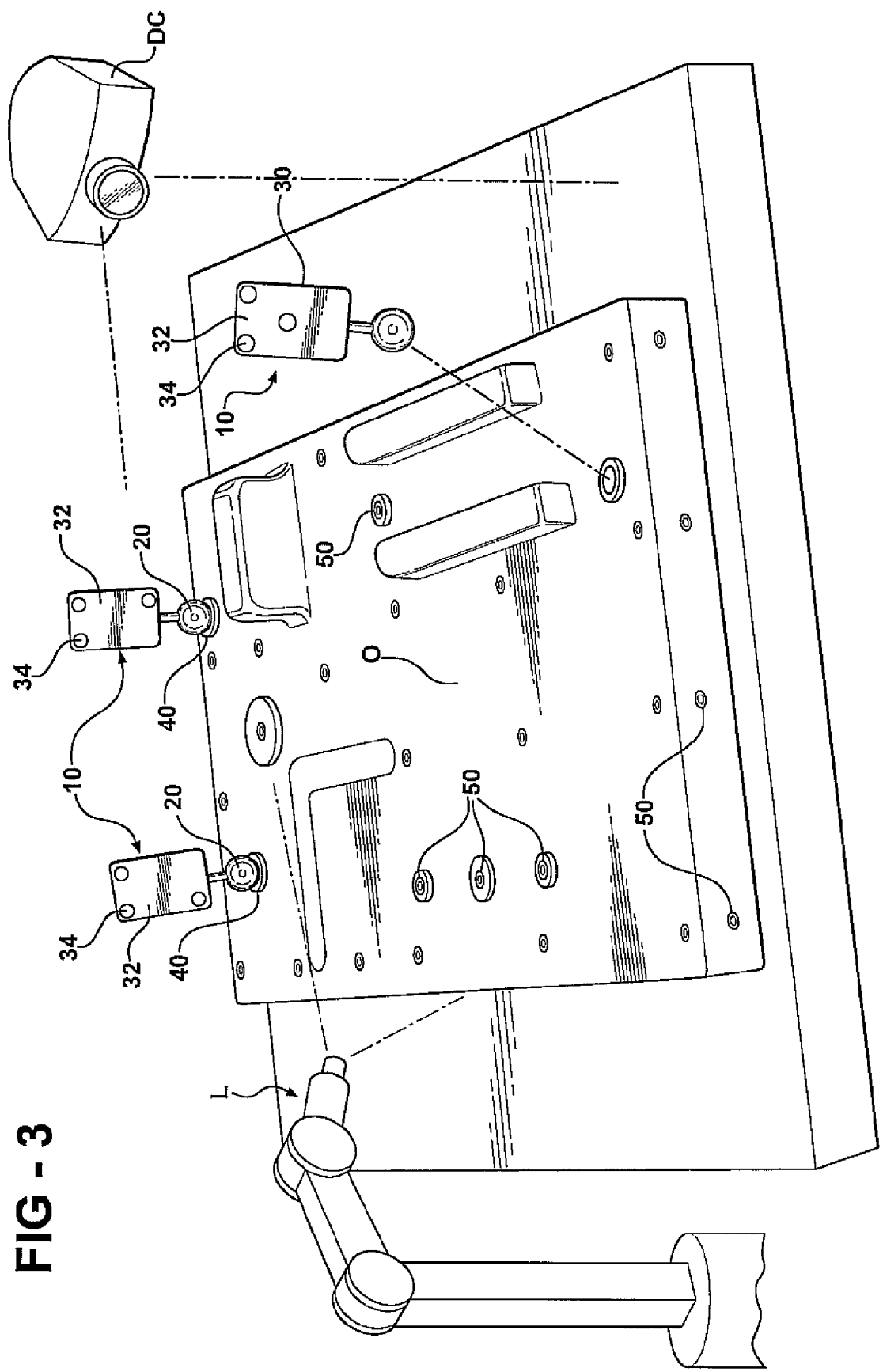
FIG. 3 is a perspective environmental view illustrating several digitizer adapter assemblies in use during a scan of an object.

As shown in FIG. 3, at least three adapter assemblies 10 are mounted to an object "O" to be measured. Each of the adapter assemblies 10 has a unique pattern of dots 34 positioned along the target surface 32. The positions of each dot 34 relative to the center of the spherical member 20 is stored for each assembly 10 in a computer used in the scanning process. The computer is loaded with conventional scan processing software provided illustratively by Gesellschaft für Optische Messtechnik (GOM) mbH located in Braunschweig, Germany.

Referring to FIG. 3, the mounting ring 40 for each adapter assembly 10 can be magnetically mounted to any desired surface along the object O if the object O or surface thereof is made from a ferrous material. It should, however, be readily appreciated by those skilled in the art that the ring 40 may be mounted to non-ferrous materials using conventional fixing means, such as adhesives. The spherical member 20 is then seated concentrically on the mounting ring 40. The user positions the target 30 at a desired orientation relative to the object O. The ring 40 magnetically attracts the spherical member 20 to create sufficient friction between the spherical member 20 and the ring 40 to maintain the desired orientation of the target 30. The target 30 may also be rotated to a desired position about the longitudinal axis of the stem 12.

A plurality of markers 50 are placed along the outer surface of the object O. Markers 50 are also placed at any holes or apertures along the outer surface of the object O for measuring the positions of the holes and apertures.

The object O is first digitized in a photogrammetric process. Images from at least two different vantage points of the object O are taken with a digital camera DC. The image is processed by the computer, which generates coordinates or point data corresponding to the dots 34 on each target 30 and markers 50 on the object. As shown in FIG. 4, the center point of the spherical member 20 of each adapter assembly 10 is then calculated based on the stored position data of the dots 34 relative to the center point of the spherical member 20.

The object O is then digitized in a surface scanning process by surface scanner. Any suitable surface scanner, as known by those skilled in the art, may be used, such as a laser or white light surface scanner. The outer surface of the object O is scanned by the scanner, which is indicated by "L" in FIG. 3. Also, the outer surface of each spherical member 20 is scanned. The center point of each spherical member 20 is calculated from at least three points from the surface scan of the spherical member 20.

The coordinate systems of the data from the photogrammetry and surface scanning processes are combined by aligning the center points of the spherical member 20 taken from each process. The combined data provides a more accurate representation of the object O when compared to data taken from each process alone. Specifically, photogrammetry provides accurate data for the positions of specific points or holes, such as fastener mounting holes, in the outer surface of the object O, but provides poor surface data. Surface scanning processes, such as laser scanning, are known to provide good surface data, but provide poor point, edge or hole data. Thus, the combination of the data from the photogrammetry and surface scanning processes provides the best of both technologies. The invention provides a tool and a method for using the tool, which facilitates combining point and surface data taken from photogrammetry and surface scanning processes, respectively.

The invention has been described in an illustrative manner. It is, therefore, to be understood that the terminology used is intended to be in the nature of words of description rather than of limitation. Many modifications and variations of the invention are possible in light of the above teachings. It should, therefore, be readily apparent that the invention may be practiced other than as specifically described, while remaining within the scope of the appended claims.

I claim:

1. A method of scanning an object, said method comprising the steps of:
   providing a digitizer adapter having at least three dots disposed along a target surface thereof, the at least three dots and the target being colored so as to have a permanent high contrast relative to the target surface, wherein the digitizer adapter includes a ferrous spherical mounting member disposed a predetermined distance from its center point to each of the at least three dots;
   securing the adapter along an outer surface of the object;
   creating a plurality of digital images of the object;
   extracting the coordinates of the at least three dots from the image using photogrammetry;
   calculating the coordinates of the center point of the ferrous spherical mounting member based on the coordinates of the at least three dots;
   generating surface data by scanning the outer surface of the object and the ferrous spherical mounting member;
   calculating the coordinates of the center point of the ferrous spherical mounting member based on at least three points from the surface data of the ferrous spherical mounting member; and
   aligning the center point coordinates to facilitate combining the data from the photogrammetric and surface scan processes.

2. A method of scanning an object as set forth in claim 1 including the step of securing at least three digitizer adapters along the outer surface of the object, each digitizer adapter having a unique arrangement of markers relative to the other digitizer adapters.

3. A method of scanning an object as set forth in claim 1, wherein the surface scanning process utilizes a laser surface scanner.

4. A method of scanning an object as set forth in claim 1, wherein the surface scanning process utilizes a white light surface scanner.

5. A method of scanning an object as set forth in claim 1 including the step of providing a plurality of dots along the outer surface of the object.

6. A method of scanning an object as set forth in claim 5 including the step of generating a point cloud corresponding to the positions of the dots using photogrammetry.

* * * * *